May 13, 1947. L. L. ANTES 2,420,580
MAGNETOMETER
Filed June 15, 1942
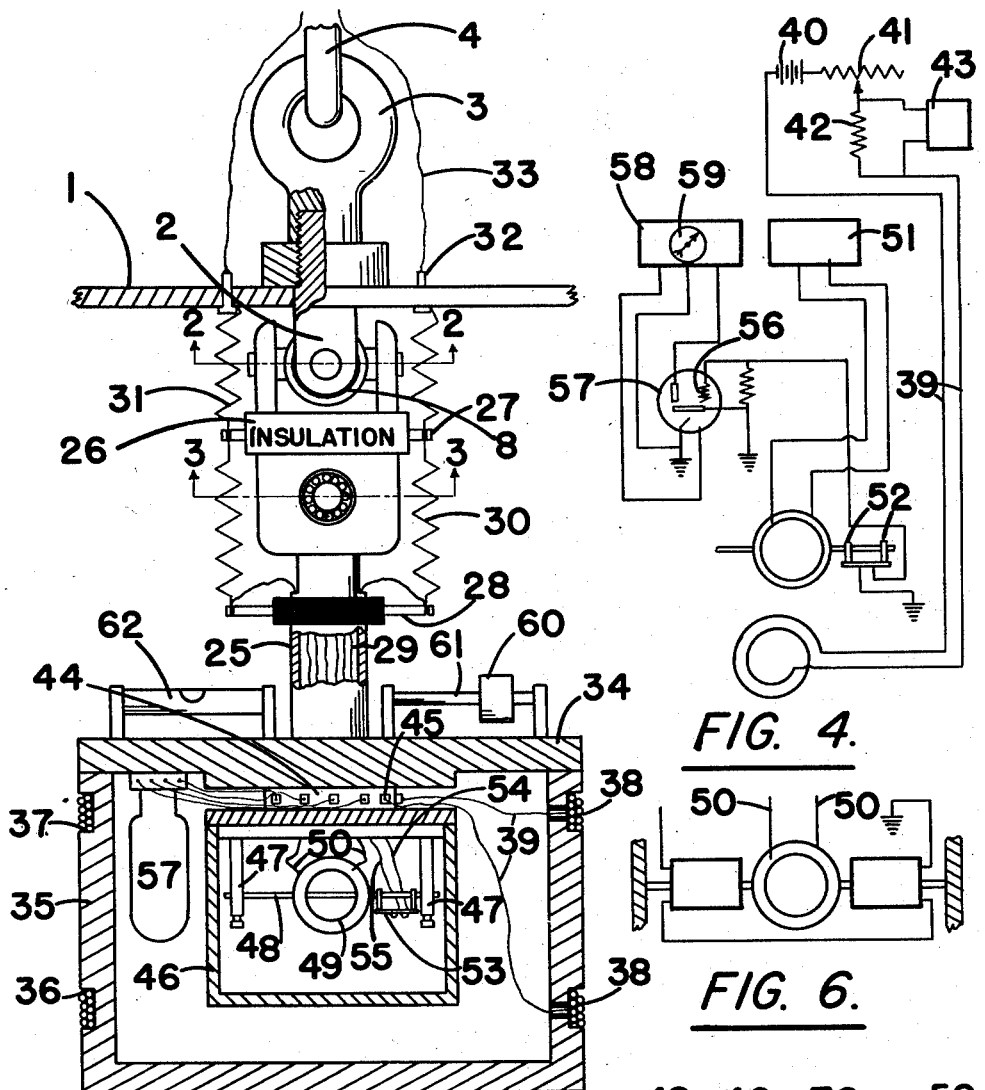
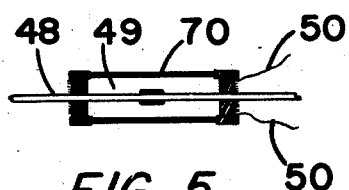
FIG. 4.
FIG. 6.
FIG. 5.
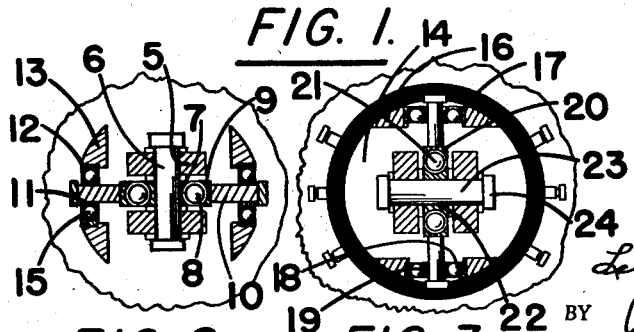
FIG. 1.
FIG. 2. FIG. 3.
Leland L. Antes INVENTOR.
BY P. J. Whelan
ATTORNEY Patented May 13, 1947

2,420,580

UNITED STATES PATENT OFFICE 2,420,580

MAGNETOMETER

Leland L. Antes, Houston, Tex., assignor to Standard Oil Development Company, a corporation of Delaware Application June 15, 1942, Serial No. 447,020

7 Claims. (Cl. 175—183)

The present invention is directed to a magnetometer of the remote reading type.

The principal object of the present invention is the provision of a device of the character described for measuring the vertical component of the earth's magnetic field characterized by the fact that it may be read at a point remote from its location thereby adapting it for underwater work. An additional object of the present invention is the provision of a device of the character described so mounted that the assembly responsive of the earth's vertical component field will always be in a horizontal position regardless of the position of the case in which it is contained, within certain limits.

Further objects and advantages of the present invention will appear from the following detailed description of the accompanying drawing, in which Fig. 1 is a front elevation partly in section of a preferred embodiment of the present invention;

Fig. 2 is a section along the line 2—2 of Fig. 1;

Fig. 3 is a section along the line 3—3 of Fig. 1;

Fig. 4 is a diagrammatical illustration of electrical circuit utilized in the arrangement shown in Fig. 1;

Fig. 5 is a plan view of a detail of the arrangement shown in Fig. 1; and

Fig. 6 is a detail of a modification of the arrangement shown in Fig. 1.

Referring to the drawing in detail, numeral 1 designates the upper wall of an outside casing through which extends the stem 2 of an eye 3 adapted to receive a cable 4. The lower end of the stem is provided with a pair of opposed ears 5 in which is journaled a shaft 6 carrying at its center a circular race 7 for ball bearings 8 on which rides a ring 9 carrying oppositely disposed rods 10, each of which carries a grooved pulley 11, which cooperates with a groove 12 in an upstanding ear 13 of a block 14 to form a race for ball bearings 15. This assembly constitutes a universal joint, another of which is composed of ears 16 depending from block 14 and spaced 90° circumferentially from ears 13. These ears 16 are similarly provided with grooves 17 in which ride bearings 18 and support a grooved pulley 19. The two grooved pulleys 19 are oppositely disposed on a ring 20 which rides on bearings 21 arranged in a raceway 22 carried by a shaft 23 which is journaled in ears 24 extending upwardly from the tube 25.

The block 14 carries a "Bakelite" ring 26 from which protrude laterally spaced posts 27. Extending laterally from tube 25 below the ears 24 and insulated therefrom are similar posts 28 to the inner ends of which are connected conductors 29 which extend upwardly from the electrical equipment arranged below and hereinafter described. Spring conductors 30 are arranged between posts 27 and 28 and similar conductors 31 between post 27 and the inner ends of studs 32 extending through wall 1. To the other ends of studs 32 are connected conductors 33 which pass through the cable 4 and are connected to electrical equipment at a remote point. These spring conductors make possible the transmission of electrical current from the equipment at the lower end of tube 25 to the equipment at a remote point while the universal joints above described are functioning.

Fixed to the lower end of tube 25 is a plate 34 which forms a cover for a pot 35. These elements are both made of brass. It may be pointed out here that in this device all of the elements are made of non-magnetic material since the purpose of the device is to respond to and give an indication of the vertical component of the earth's magnetic field. Arranged in grooves 36 and 37 on the outer surface of the pot 35 is a Helmholtz coil 38 which is connected by conductors 39 to a battery 40 arranged at a remote point. The circuit of this coil includes a rheostat 41 to the pointer of which is connected in series a resistance 42 across which is a potentiometer 43. Fixed to the underside of cover 34 is a Bakelite plate 44 having a central opening corresponding to that in tube 25 and provided around its periphery with studs 45 extending from its outer surface to its inner surface to provide terminals for the necessary electrical conductors. Fixed to the Bakelite plate is a sealed casing of brass 46 in which is mounted a pair of posts 47 forming supports for a bar 48 which is rigidly secured to the posts. The bar has fixed to its center a barrel or cylinder 49 made of insulating material upon which is wound a copper coil connected by conductors 50 to an oscillator 51 at a remote point.

As can be seen from Fig. 5, the cylinder is of greater diameter than length and the bar 48 passes through the center of the cylinder midway of its length. The coil, indicated by numeral 70, is made up of two sets of windings arranged in series and spaced from each other equidistantly from the longitudinal center of the cylinder.

Between the coil and one of the posts 47 there is rigidly fixed to the bar by means of suitable brackets 52 of insulating material a crystal 53 made of Rochelle salt or any other mineral which is capable of generating voltage when subjected to a strain in the nature of a torque. The crystal commonly known as a "twister" and made up of two laminations of Rochelle salt cemented to either side of a sheet of conducting material, the assembly being wrapped in metal foil is preferred. With such a crystal one conductor is connected to the sheet of conductive material and the ground conductor is connected to the metal foil. It is important that the brackets 52 be rigidly secured to the rod 48 since it is their function to transmit to the crystal 53 the torque in the rod between the points of attachment of the brackets. To the "ground" terminal of the brackets is connected a lead 54 which is connected to a suitable ground stud 45 in the Bakelite plate 44. To the other terminal of the crystal is connected a lead 55 which is also connected through a suitable stud 45 to a second lead connected to the grid 56 of a vacuum tube amplifier 57 fixed to the undersurface 34. The power is supplied to the amplifier and its output delivered to the surface through suitable conductors connected through studs 45 to conductors arranged in tube 25 and connected to suitable studs 28 and thence through spring conductors to studs 32 to conductors 33 and to the surface to an arrangement 58 which includes additional amplification, a source of power and an indicator 59 for indicating a value proportional to the voltage generated in the crystal 53.

In operation the arrangement described above responds to and gives an indication of the vertical component of the earth's magnetic field. Its action is based on the electric motor principle that a current passing through a coil arranged in a magnetic field tends to cause the coil to move. An alternating current is passed through the oil arranged on cylinder 49. The tendency of this cylinder and coil to vibrate in response to the alternating current creates a torque in the rod 48 which is transmitted through brackets 52 to the crystal 53 which generates a voltage proportional to the torque. This voltage is amplified and transmitted to the remote reading point where it is observed. In order to operate the instrument at its greatest sensitivity oscillator 51 is adjusted until the frequency of the current delivered to the coil is the resonant frequency of the system, that is, the frequency at which the greatest oscillation of the coil around its axis is achieved. This point can be readily determined by adjusting the oscillator frequency while observing the meter 59.

In order to determine the vertical component of the earth's magnetic field by the use of this device, the Helmholtz coil is used to create a field in opposition to said vertical component and the field created by the Helmholtz coil is adjusted by means of the rheostat 41 until the indicator 59 shows that the torque in rod 48 is reduced to zero or to some pre-determined fixed value. Thus in the use of the instrument the oscillator 51 is adjusted at a base station to the desired sensitivity and the field of the Helmholtz coil is adjusted until the indicator 59 is at a selected null point. Then as the device is moved from station to station the Helmholtz coil current is adjusted at each station to bring the indicator 59 to the null point, and the reading of the potentiometer 43 after each such adjustment is taken as the significant figure indicative of the vertical components of the earth's magnetic field.

As will be observed, the entire assembly is self-leveling. In order to compensate for the arrangement of parts on the interior of the pot 35 there is provided on the upper plate 34 a plurality of slidable weights 60 arranged on bars 61 disposed at angles to each other on different parts of the plate 34. Only one such adjusting weight is shown. By adjusting the position of these weights, the instrument can be brought to a level as shown by the level indicator 62 of which there will be two arranged at right angles to each other. Once the weights 60 are adjusted to compensate for the arrangement of parts inside the pot and bring the assembly to a level, it will always assume the same position regardless of the position of the outside casing. Of course, there will be limits on the amount that the outside case, of which 1 is the upper wall, may be tilted depending upon the size of this case. It will be convenient to arrange electrical contacts on the side walls of the outside case of which the wall 1 is the top so that when the pot 35 comes in contact with said side walls an electrical signal will be actuated at a remote point.

Referring to Fig. 6, it will be noted that it differs from Fig. 1 by the provision of two crystals which are connected in series to the vacuum tube amplifier so that their effect is accumulative. This is merely an expedient for increasing sensitivity.

The device described above is particularly useful for underwater operations. For this purpose the outside case is of course made water-tight and will usually be made of heavy brass. Between the outside case and the pot 35 there will be provided effective insulation such as that obtainable by the use of thick balsa wood. There will also be provided, in the customary manner, a thermostatic control for keeping the temperature constant. Such controls are not novel with this device but are conventionally used in gravity meters and other measuring devices, the essential parts of which are subject to change with temperature.

The nature and objects of the present invention having been thus described and illustrated, what is claimed as new and useful and is desired to be secured by Letters Patent is:

1. A magnetometer comprising a coil the plane of which is normally vertically disposed, means for supplying alternating current to said coil, means including a piezo-electric member for resisting the movement of said coil about its transverse axis resulting from the application of said current and means electrically connected with said piezo-electric member for indicating the extent of such resistance.

2. A remote reading magnetometer comprising a coil having its plane normally in a vertical position, a rod passing through the transverse axis of said coil and rigidly connected thereto, means for supplying alternating current to said coil, whereby said coil is caused to oscillate by the vertical component of the earth's magnetic field, means remote from said assembly for indicating the torque in said rod as a result of the oscillations of said coil and means operably associated with said rod for communicating said torque to said indicating means.

3. A remote reading magnetometer comprising a coil normally arranged in a vertical plane, a rod passing through the transverse axis of said coil and rigidly secured thereto, means for supplying alternating current to said coil, whereby it is caused to oscillate about its transverse axis by the vertical component of the earth's magnetic field, means at a point remote from said assembly for indicating the torque set up in said rod as a result of the oscillations of said coil, means operably associated with said rod for communicating said torque to said indicating means and means for neutralizing the effect of the earth's magnetism on said coil.

4. An apparatus according to claim 3 in which there is fixed to the rod between two spaced points thereof a crystal which generates a voltage when subjected to stress, and means are provided for transmitting the voltage generated by said crystal to the indicating means.

5. A remote reading magnetometer comprising an assembly mounted for free suspension and including a coil arranged in a vertical plane, a rod passing through the transverse axis of said coil and rigidly secured thereto, a crystal of the type in which a potential difference is created in response to stress connected to said rod in such a way as to be subjected to stress when said rod is subjected to torque, means for connecting said crystal to a remotely arranged voltmeter, means for supplying alternating current to said coil, whereby it is caused to oscillate about its transverse axis by the vertical component of the earth's magnetic field, and a Helmholtz coil arranged around said coil in such a manner that the magnetic field created by a current passing through said Helmholtz coil may be utilized to neutralize the vertical component of the earth's magnetic field, and means for adjusting the current supplied to said Helmholtz coil.

6. An apparatus according to claim 5 in which each end of the rod is connected to one end of a separate crystal, the other end of which is secured to a rigid support, and means are provided for combining the voltages generated by said crystals.

7. An apparatus according to claim 5 in which the suspension for the assembly includes two universal joints arranged to supplement each other, and is provided with a socket for receiving a cable for the suspension of the assembly.

LELAND L. ANTES.

REFERENCES CITED

The following references are of record in the file of this patent:

UNITED STATES PATENTS

| Number | Name | Date |
| --- | --- | --- |
| 1,863,415 | Rieber | June 14, 1932 |
| 2,151,627 | Vacquier | Mar. 21, 1939 |
| 1,666,309 | Ray | Apr. 17, 1928 |
| 1,630,989 | Usigli | May 31, 1927 |
| 2,288,781 | Brown | July 7, 1942 |
| 2,331,617 | Moore | Oct. 12, 1943 |
| 1,417,803 | Cruz | May 30, 1922 |

FOREIGN PATENTS

| Number | Country | Date |
| --- | --- | --- |
| 22,330 | Great Britain | 1900 |